W. D. DORSEY.
Wheel-Cultivator.
No. 27,703
Patented Apr. 3, 1860.
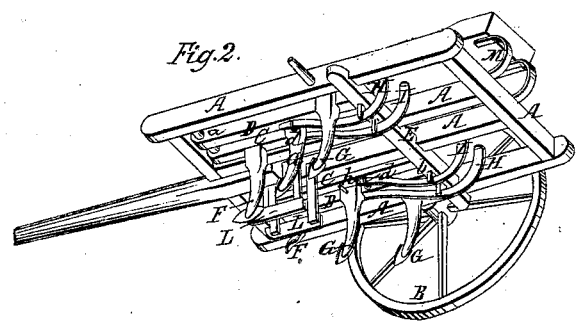
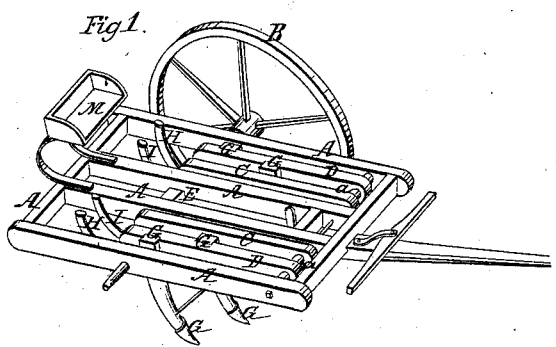
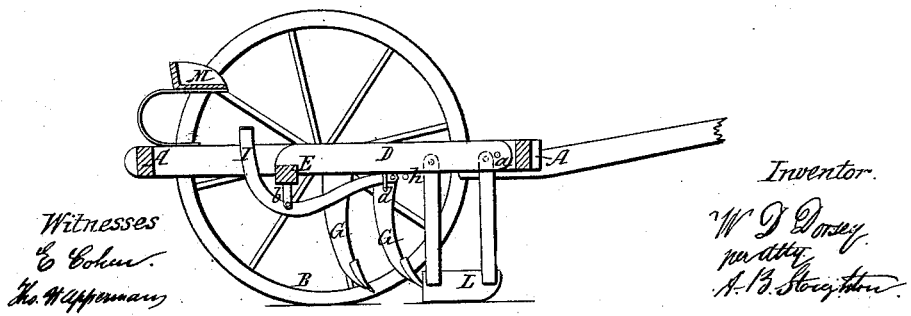

UNITED STATES PATENT OFFICE.

W. D. DORSEY, OF DECATUR, ILLINOIS.

IMPROVEMENT IN CULTIVATORS.

Specification forming part of Letters Patent No. 27,703, dated April 3, 1860.

*To all whom it may concern:*

Be it known that I, W. D. DORSEY, of Decatur, in the county of Macon and State of Illinois, have invented certain new and useful Improvements in Corn-Cultivators; and I do hereby declare that the following is a full, clear, and exact description of the construction and operation of the same, reference being had to the accompanying drawings, in which—

Figure 1 represents a perspective view of said corn-cultivator. Fig. 2 represents a perspective view of the same from below. Fig. 3 represents a longitudinal vertical section through the same.

My invention relates to the manner of hinging the hoe-beams to the frame of the machine, and to so connecting them with levers as to enable the driver from his seat, by treading on said levers, to raise either of the central hoes from the ground to avoid plowing up a hill of corn should it be out of line, or to raise all the hoes simultaneously from the ground when the machine is to be turned, or when it is to be moved from one locality to another; and it further relates to the shield-pieces for protecting the plants, when quite small, from being buried up by the clods of earth or soil that is turned up or over by the points or hoes that work nearest to them.

To enable others skilled in the art to make and use my invention, I will proceed to describe its construction and operation.

A represents the frame of the machine, which is supported by the wheels B.

C C and D D represent the hoe-beams, which are hinged to the frame A at *a*, and the free ends of which are supported by a cross-beam, E. The cultivator-teeth are secured to these beams, the two central teeth, F, being secured to the beams C, while the four outer teeth, G, are secured in pairs to the beams D.

H H and I I are treadle-levers, which are pivoted to the hangers *b* of the cross-piece E, and the long arms of which extend forward and below the hoe-beams, where their ends pass through the staples *d* to prevent them from moving sidewise. These levers raise the hoe-beams when the treadles are pressed down, the levers H acting on the beams D and the levers I on the beams C.

*h*, Figs. 2, 3, represents a pin, which is secured to the shank of the inner hoe, G, and which extends sidewise under the beam C, so that when the beam D is raised the pin *h* shall lift simultaneously the beam C. By this arrangement all the hoes can be raised simultaneously by treading on the treadles H, while by treading on the treadles I the central hoes, F, only are raised from the ground.

L represents shields, which pass on both sides of the plant, and which are intended to protect the young plants from being covered with clods by the front plows.

This cultivator is intended to be drawn by two horses, so that the protecting-shields L shall pass one on each side of a row of plants. If the plants are not planted in a straight row, the driver on his seat M, when necessary, can raise either of the central hoes, F, by treading on one of the levers I, whereby said hoes are passed over the young plants, which otherwise would be plowed up. If the machine is to be turned around or to be moved from one locality to another, the driver puts one foot on each of the treadles H, whereby all the hoes are raised from the ground simultaneously. In the last cultivation of the corn the hoes may be taken off their shanks, and may be replaced by mold-boards for the purpose of hilling the corn.

Having thus fully described the nature of my invention, what I claim therein as new, and desire to secure by Letters Patent, is—

1. So combining the hinged beams C D of a cultivator with the treadles H I as that the driver on his seat may raise either of the two central cultivator-hoes, F, separately or all the hoes simultaneously, when constructed and arranged substantially in the manner and for the purposes described.

2. In combination with the pairs of hoes so hung and operated, the shields L L for protecting the young plants from the sods, earth, or soil turned up by the hoes, substantially as described.

W. D. DORSEY.

Witnesses:
 JOHN GROSS,
 J. H. BURNETT.